US008249855B2

(12) United States Patent
Zhou et al.

(10) Patent No.: US 8,249,855 B2
(45) Date of Patent: Aug. 21, 2012

(54) IDENTIFYING PARALLEL BILINGUAL DATA OVER A NETWORK

(75) Inventors: Ming Zhou, Beijing (CN); Cheng Niu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 160 days.

(21) Appl. No.: 11/500,051

(22) Filed: Aug. 7, 2006

(65) Prior Publication Data

US 2008/0126076 A1    May 29, 2008

(51) Int. Cl.
     *G06F 17/28*      (2006.01)
(52) U.S. Cl. ............. 704/2; 704/7; 704/8; 704/4; 704/5; 715/254; 715/264
(58) Field of Classification Search .................. 702/1–8; 709/231; 711/118
See application file for complete search history.

(56) References Cited

U.S. PATENT DOCUMENTS

| | | | |
|---|---|---|---|
| 5,987,402 A * | 11/1999 | Murata et al. | 704/2 |
| 6,064,951 A | 5/2000 | Park et al. | 704/8 |
| 6,159,557 A | 12/2000 | Meyer-Roscher et al. | 704/8 |
| 6,275,789 B1 * | 8/2001 | Moser et al. | 704/7 |
| 6,347,316 B1 | 2/2002 | Redpath et al. | 707/10 |
| 6,598,015 B1 | 7/2003 | Peterson et al. | 704/3 |
| 6,604,101 B1 * | 8/2003 | Chan et al. | 707/4 |
| 6,757,646 B2 * | 6/2004 | Marchisio | 704/8 |
| 6,850,934 B2 | 2/2005 | Bates et al. | 707/5 |
| 7,016,977 B1 | 3/2006 | Dunsmoir et al. | 709/246 |
| 7,146,358 B1 * | 12/2006 | Gravano et al. | 1/1 |
| 2002/0002452 A1 | 1/2002 | Christy | 704/3 |
| 2004/0044518 A1 | 3/2004 | Reed | 704/8 |
| 2004/0167768 A1 * | 8/2004 | Travieso et al. | 704/2 |
| 2004/0230418 A1 * | 11/2004 | Kitamura | 704/8 |
| 2004/0237044 A1 | 11/2004 | Travieso | 715/530 |
| 2005/0086224 A1 * | 4/2005 | Franciosa et al. | 707/6 |
| 2005/0155017 A1 | 7/2005 | Berstis | 717/114 |
| 2006/0111893 A1 * | 5/2006 | Florian et al. | 704/8 |
| 2007/0112533 A1 * | 5/2007 | Tomimatsu et al. | 702/81 |
| 2007/0112553 A1 * | 5/2007 | Jacobson | 704/2 |

OTHER PUBLICATIONS

Inforadar-CI: A Cross-Lingual Information Discovery Tool Exploiting Automatic Document Categorization, Jairo E. Valiente-Fernandez et al., 6 pages.
Barriers to Information Access across Languages on the Internet: Network and Language Effects, Anett Kralisch et al., 2006 IEEE. 10 pages.
Bilingual Parallel Corpora and Language Engineering, Harold Somers, 16 pages.

* cited by examiner

*Primary Examiner* — Twyler Haskins
*Assistant Examiner* — Brendan McCommas
(74) *Attorney, Agent, or Firm* — Joseph R. Kelly; Westman, Champlin & Kelly, P.A.

(57) ABSTRACT

A set of candidate documents, each of which may be part of a bilingual, parallel set of documents, are identified. The set of documents illustratively includes textual material in a source language. It is then determined whether parallel text can be identified. For each document in the set of documents, it is first determined whether the parallel text resides within the document itself. If not, the document is examined for links to other documents, and those linked documents are examined for bilingual parallelism with the selected documents. If not, named entities are extracted from the document and translated into the target language. The translations are used to query search engines to retrieve the parallel correspondent for the selected documents.

14 Claims, 6 Drawing Sheets

IDENTIFYING PARALLEL BILINGUAL DATA OVER A NETWORK

BACKGROUND

Parallel bilingual corpora, as used herein, refers to textual data in a first language that is identified as a translation of textual data in a second language. For the sake of example, the textual data discussed herein is documents, but other textual data can be used as well.

When one document is a translation of another document, the two documents are referred to as parallel, bilingual documents. Therefore, parallel, bilingual corpora refers to a first corpus of data in a first language and a second corpus of data in a second language, wherein the second corpus is a translation of the first corpus.

Within a set of parallel documents, sentences in those documents which are translations of one another are often identified. These are referred to as aligned sentences. Therefore, if a document in a first language coincides with a parallel document in a second language (i.e., they are parallel), and the sentences in the two documents are aligned with one another (in that a sentence in the first language is aligned with its translation in the second language) then the two documents are referred to as parallel, sentence-aligned, bilingual documents.

There is currently a wide need for parallel, bilingual corpora. For instance, such corpora are often critical resources for training statistical machine translation systems, and for performing cross-lingual information retrieval. Additionally, some such corpora have even been exploited for various monolingual natural language processing tasks, such as word sense disambiguation and paraphrase acquisition.

However, large scale parallel corpora are currently not readily available for most language pairs. Even in those languages where some such corpora are available, the data in those corpora are usually restricted to government documents or newswire texts. Because of the particular writing styles or domain-specific language used in these types of documents, these corpora cannot be easily used in training data driven machine translation systems or information retrieval systems, or even the monolingual, natural language processors discussed above, for a range of domains in different language pairs.

There has recently been a sharp increase in the number of bilingual pages available on wide area networks (such as websites). Therefore, some web mining systems have been developed to automatically obtain parallel, bilingual corpora from the worldwide web. These systems use uniform resource locators (URLs), and assume that parallel web pages are named with predefined patterns to facilitate website maintenance. Therefore, when these systems are given a bilingual website URL, they use the predefined URL patterns in an attempt to discover candidate parallel documents within that website. Content-based features are then used to verify the translational equivalence of the candidate pairs.

These types of systems have met with limited success. For instance, there is a wide diversity of web page styles and website maintenance mechanisms. Therefore, bilingual websites often use varied naming schemes for parallel documents, which do not conform to predefined patterns. Especially, these systems cannot mine parallel documents located across websites (i.e. where the document in the source language and the document in the target language are located in different websites).

In addition, these URL pattern-based mining systems can be problematic with respect to bandwidth. These types of mining processes require a full host crawling to collect URLs before using predefined URL patterns to discover possible parallel documents. Therefore, these URL pattern-based systems often require high bandwidth, and high cost, and result in slow download speeds. Since even many bilingual websites have only a very limited number of parallel documents, a significant portion of the network bandwidth is wasted on downloading web pages that do not have translational counterparts.

The discussion above is merely provided for general background information and is not intended to be used as an aid in determining the scope of the claimed subject matter.

SUMMARY

A set of candidate documents, each of which may be part of a bilingual, parallel set of documents, are identified. The set of documents illustratively includes textual material in a source language. It is then determined whether parallel text can be identified. For each document in the set of documents, it is first determined whether the parallel text resides within the document itself. If not, the document is examined for links to other documents, and those linked documents are examined for bilingual parallelism with the selected documents.

In other embodiments, if there are no documents linked to the selected document, or if those documents are not bilingual, parallel documents, relative to the selected document, then it is determined whether the selected document contains words in the target language, and if so, those words are used in a query to identify a parallel document. In another embodiment, named entities are identified in the selected document, and the named entities, or translations thereof, are used in a query to identify possible bilingual, parallel documents.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

The present description proceeds with respect to the term "document" or "documents". This term is used by way of example only, and is not intended to limit the textual material referred to as a "document" or "documents" as having any formal definition, as such. Instead, the term is used for the sake of expedience and the present invention can apply to any sets of textual material, or text fragments, or other text chunks, equally as well, without limiting the invention to "documents".

Figure 1:
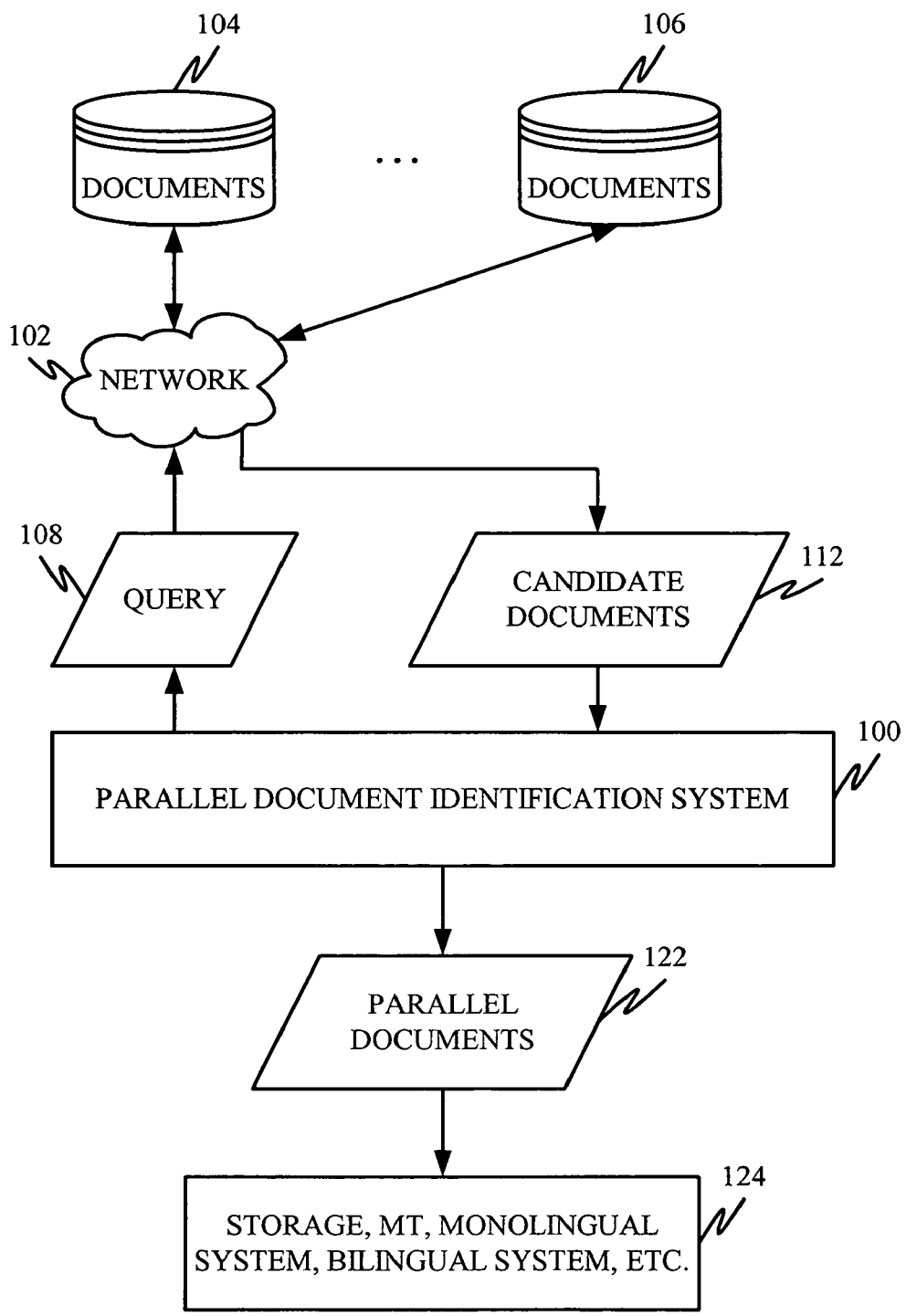
FIG. 1 is a block diagram of one embodiment of a parallel document identification system that is coupled to a network.

FIG. 1 is a block diagram of one embodiment of a parallel document identification system 100 shown coupled to a network 102. In one embodiment, network 102 is a wide area network, such as the internet, but could be a local area network, an intranet, or any other type of network. Network 102 is shown having access to documents 104 and 106. In this illustrative embodiment, documents 104 and 106 are web pages that are located on two or more different websites. Of course, documents 104 and 106 could simply be document stores storing documents for access by a user of an intranet, they could be server-based document storage systems, or any of a wide variety of other systems that make documents (or other textual corpora) available to a user. In the embodiment described herein, parallel document identification system 100 identifies parallel, bilingual documents located in documents 104 or 106, or both.

Figure 2:
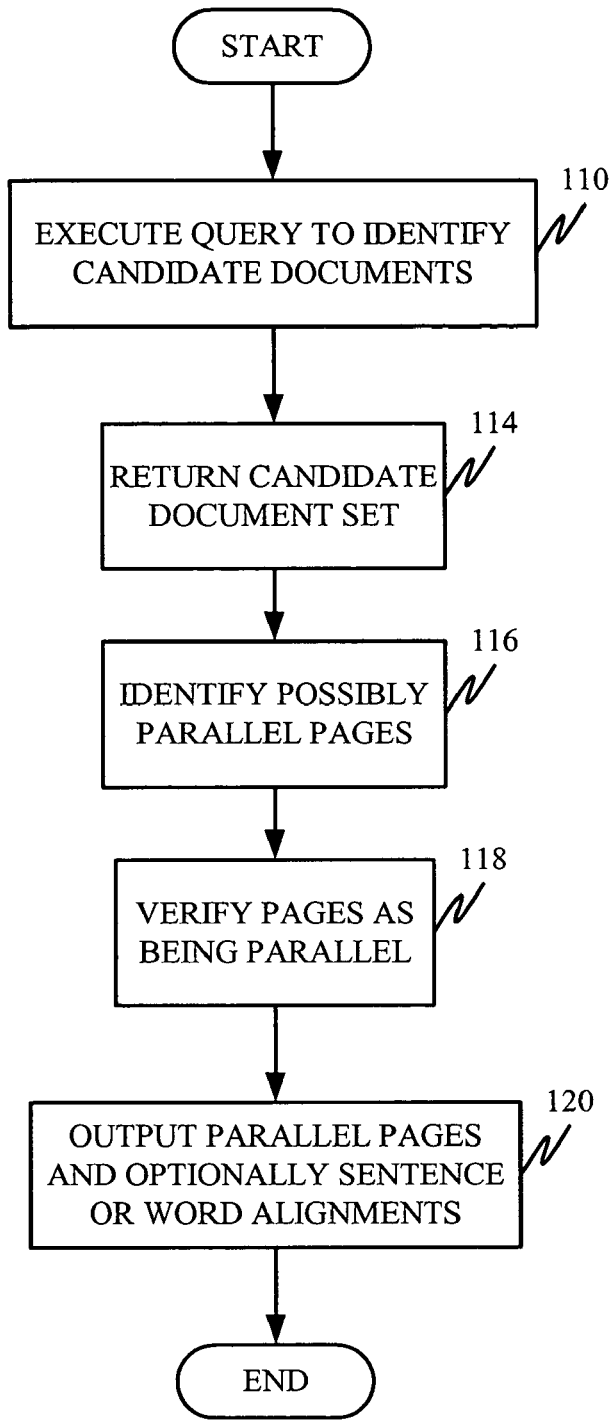
FIG. 2 is a flow diagram illustrating one embodiment of the overall operation of the system shown in FIG. 1.

FIG. 2 is a flow diagram illustrating the overall operation of system 100, in accordance with one embodiment. Parallel document identification system 100 first illustratively generates and executes a query 108 against documents 104-106. This is indicated by block 110 in FIG. 2. The particular query generated can take any of a wide variety of forms, but illustratively includes translation triggering words that direct a search engine to look for documents that have corresponding translations into another language.

In one illustrative embodiment, the query may identify a specific source of documents (such as a newspaper, a library, a publisher, or another source of documentation) and include the words "translated from" along with that source. For instance, the query may be "translated from Home Town Journal", where "Home Town Journal" is the name of a specific newspaper.

Similarly, such a query (or some form of the query) may be included in both the source language (the original language in which the document was written) and the target language (the language for which a translation of the document is desired). Therefore, if the source language is English (meaning that a newspaper article was first written in English), and a translation into the Chinese language, for that particular article, is desired, then the query may include the phrase "translated from the Home Town Journal" in both the English language and the Chinese language. Or it may be included only in the target language, as described. Of course, these are simply optional querying techniques.

In addition, the query may also include specific content words that can be combined with the translation triggering words. This helps a search engine to find documents, with translations, in a specific subject matter domain.

In any case, parallel document identification system 100 formulates and executes query 108 against the documents 104 and 106, in the exemplary embodiment, over network 102. A set of candidate documents 112 is returned in response to the query. This is indicated by block 114 in FIG. 2. Parallel document identification system 100 then identifies possible parallel pages, or parallel documents, or other parallel textual material, from the returned candidate documents 112. Identifying the possibly parallel pages is indicated by block 116 in FIG. 2.

Once the possibly parallel pages are identified, parallel document identification system 100 verifies the pages as being parallel. This is indicated by block 118 in FIG. 2. Verification of parallelism can take one of a wide variety of different forms. In one illustrative embodiment, verification is content-based parallelism verification. In that embodiment, the content of the documents is analyzed to determine that they are translationally equivalent, or at least have a degree of translational equivalence that meets a threshold giving rise to a determination that the documents, or other textual content, are indeed parallel.

In one exemplary embodiment, parallelism is verified using sentence alignment. There are a wide variety of different, generally known, mechanisms and algorithms for aligning sentences of two different languages. In one illustrative embodiment, given a set of potentially parallel pages, sentence alignment is performed on those pages and an alignment score is computed. An exemplary alignment score may simply be the ratio of a number of aligned sentences in the two documents to the total number of sentences in the two documents. If the score is higher than a threshold value, then the pair of documents is regarded as being parallel. Of course, a wide variety of other sentence alignment scores, or parallelism verification techniques can be deployed, and the present one is exemplary only.

In any case, once the possibly parallel pages have been verified as, indeed, being parallel, the parallel pages are output. This is indicated by block 120 in FIG. 2. It should also be noted that additional alignment can be performed between the two pages, such as sentence alignment or word alignment, or any other alignment, and any other or processing can be performed on the parallel documents. The parallel documents are indicated by block 122 in FIG. 1, and they can be output to any desired system, such as a storage system, a machine translation system, a monolingual or bilingual system, etc. These systems are represented by block 124 in FIG. 1.

Figure 3:
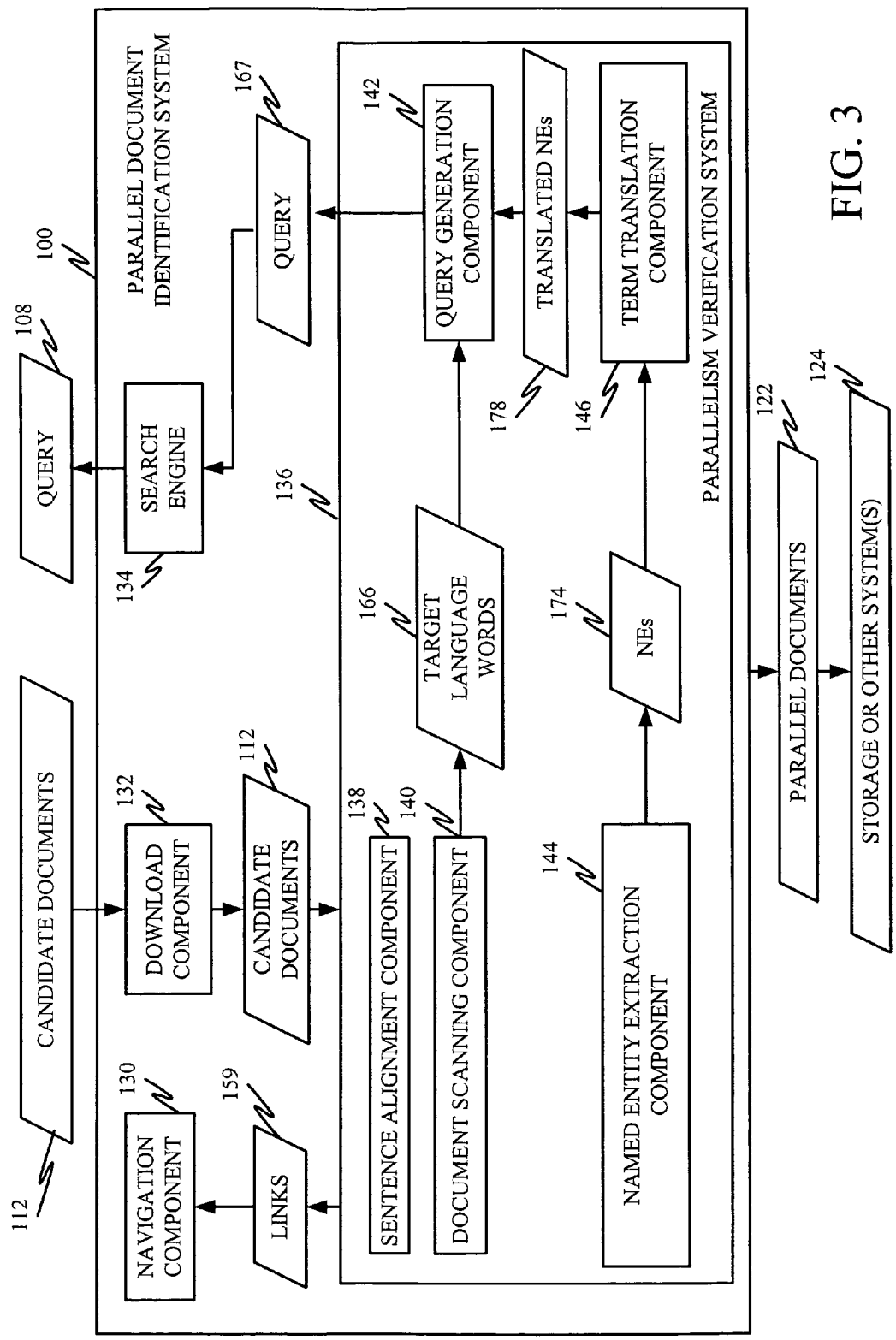
FIG. 3 is a more detailed block diagram of one embodiment of a parallel document identification system.

FIG. 3 is a more detailed block diagram of parallel document identification system 100 in accordance with one embodiment. In the exemplary embodiment shown in FIG. 3, system 100 includes navigation component 130, download component 132, search engine component 134, and parallelism verification system 136. System 136, itself, includes sentence alignment component 138, document scanning component 140, query generation component 142, named entity extraction component 144, and term translation component 146.

Figure 4A:
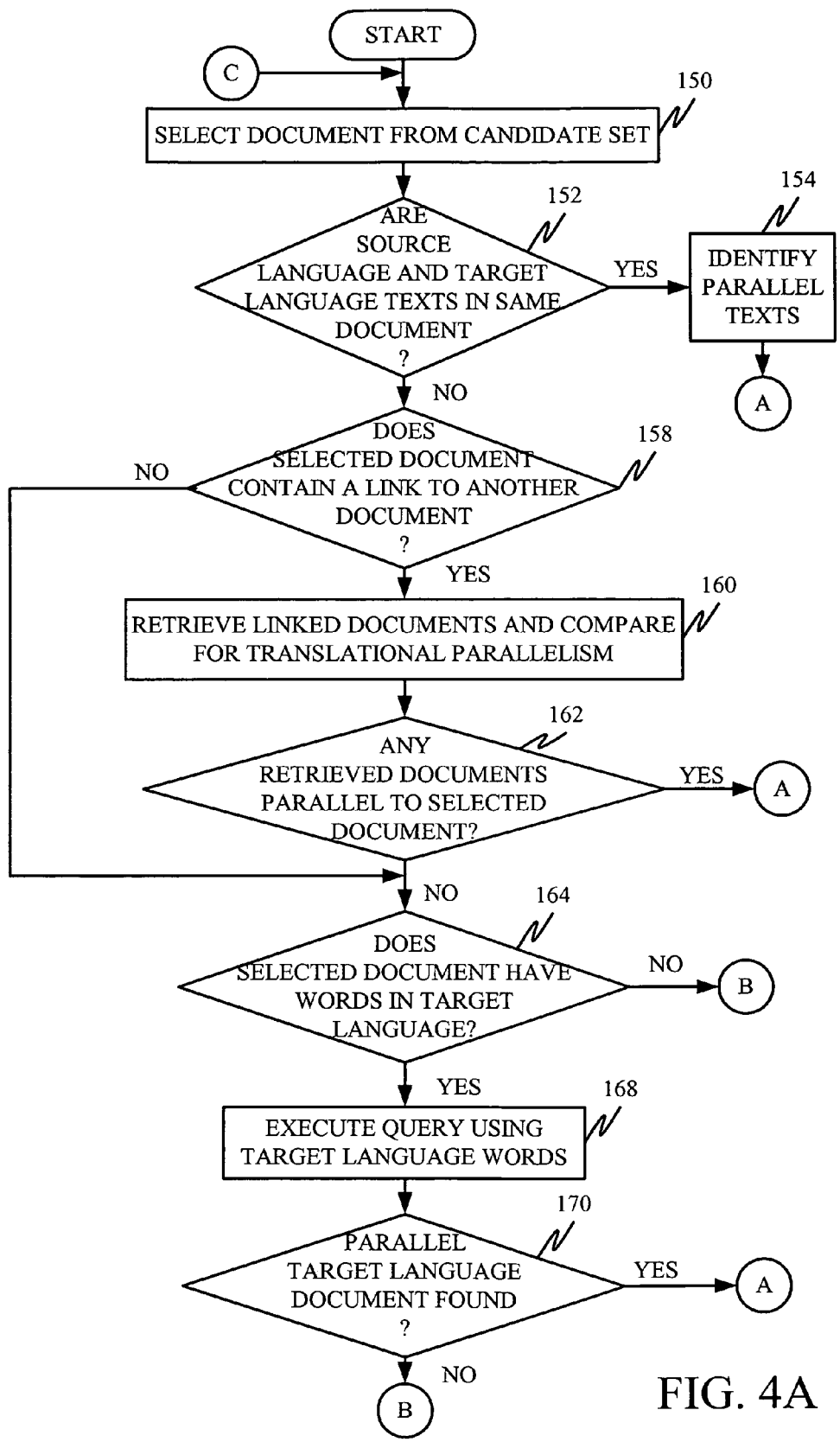
FIGS. 4A and 4B show a more detailed flow diagram illustrating one embodiment of the operation of the system shown in FIG. 3.
Figure 4B:
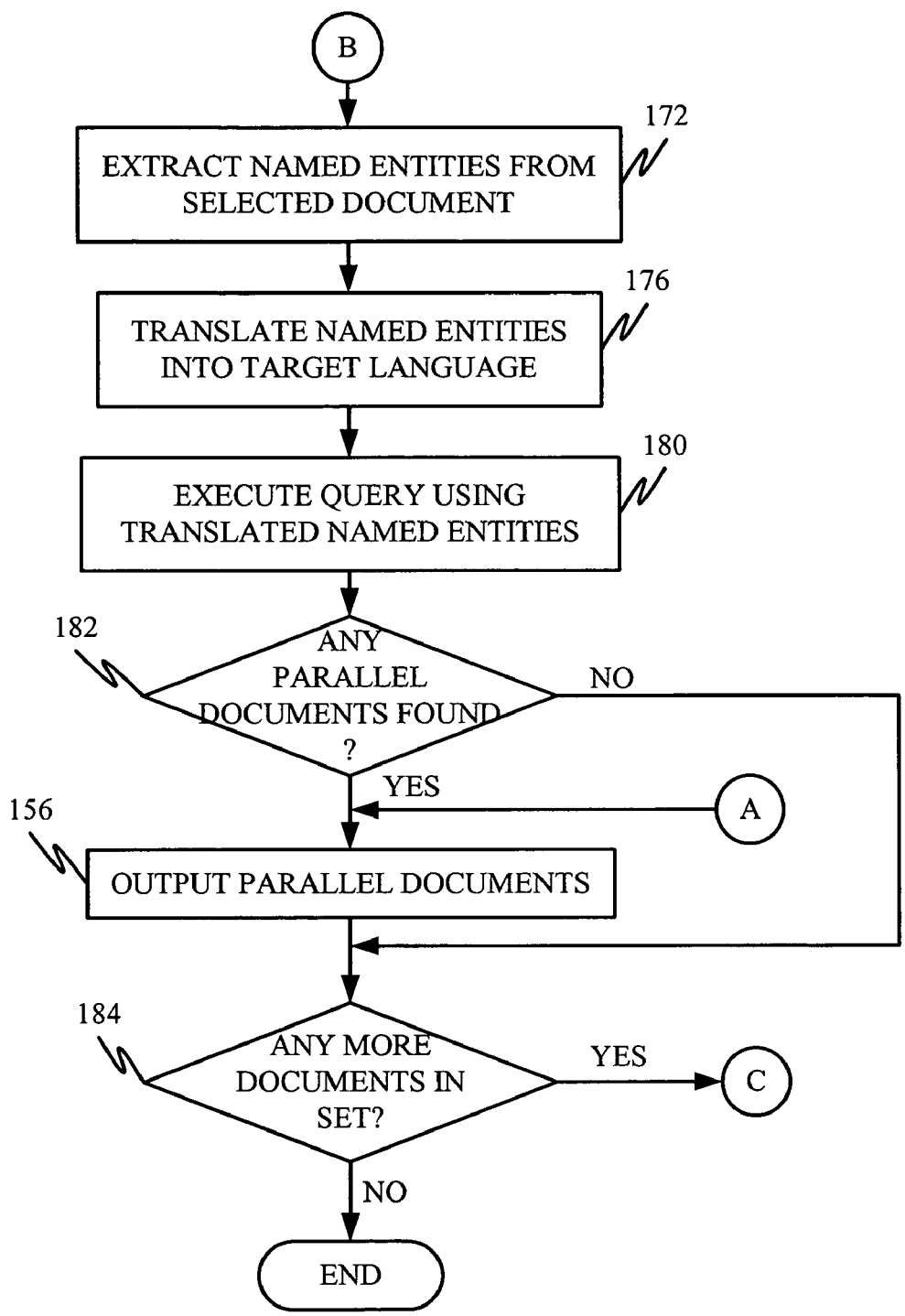

FIGS. 4A and 4B show a flow diagram illustrating one illustrative embodiment of the operation of system 100 shown in FIG. 3, in more detail. In the embodiment shown in FIGS. 4A and 4B, system 100 has already identified the candidate set of documents 112. As described above with respect to FIGS. 1 and 2, this can be done in a wide variety of ways, such as executing a query formed of translational trigger words against documents accessible over a network. This can be done, for instance, by using search engine 134. The candidate documents 112 are then downloaded to system 100 by download component 132. It will also be noted that navigation component 130 is provided such that system 100 can navigate to any of a variety of different locations accessible by network 102, such as different websites, for instance.

Assuming, then, that the set of candidate documents 112 has been identified, and downloaded to parallelism verification system 136 by download component 132, system 136 then selects one of the documents from the candidate document set. This is indicated by block 150 in FIG. 4A. System 136 then initially checks to determine whether the selected candidate document is written bilingually. In other words, it sometimes happens that a chunk of text in a document has a translation of that chunk of text, into a second language, in the same document. This can be checked in one of a variety of different ways.

In one illustrative example, sentence alignment component 138 is used to perform traditional sentence alignment on the blocks or chunks of text in the two different languages. Using this type of translational sentence alignment, it can be determined whether the two chunks of text are indeed sufficiently translationally equivalent to verify them as being parallel text chunks. Verification of this is indicated by block 152 in FIG. 4A. If the two text chunks are indeed parallel, then they are identified as such, as indicated by 154, and processing skips to block 156 where the parallel texts are output as parallel documents.

If, at block 152, the document does not contain both the source and target language texts, then system 136 determines whether the selected document contains a link to another document. This can be done using any type of parser, or other system that can identify links, such as hyperlinks. Determining whether the selected documents contain links to other documents is indicated by block 158 in FIG. 4A.

If not, then processing skips to block 164. If so, however, then the links 159 (shown in FIG. 3) are provided to navigation component 130. The links are followed, and the pages linked to the selected document are downloaded using download component 132. The downloaded documents are compared to the selected documents for translational parallelism. Retrieving and checking the documents for parallelism is indicated by block 160 in FIG. 4A. Again, translational parallelism can be determined using a wide variety of different mechanisms or techniques, one of which may be by using sentence alignment component 138, as described above.

If the documents are verified as being parallel documents, processing skips to block 156 where the parallel documents are output. Identifying whether the documents are parallel is indicated by block 162 in FIG. 4A. Of course, the process of retrieving linked documents and comparing them for translational equivalence to the selected document can be repeated for each of the links in the selected document.

If, at block 158, the selected document does not contain any links, or if at block 162 the linked pages are not parallel, then system 136 determines whether the selected document contains any words in the target language. This is indicated by block 164 in FIG. 4A. In one exemplary embodiment, the selected document is scanned for words in the target language by document scanning component 140. Document scanning component 140 can be any type of processing component that identifies words in different languages, such as a natural language processing parser, a language identifier, or any other of a wide variety of mechanism or techniques.

In any case, if the selected document does contain target language words 166 (in FIG. 3) those words are provided to query generator component 142 that generates a query 167 using those target language words. In one embodiment, this is done simply by concatenating the words into one string. The query 167 is provided to search engine 134 that executes the query against the documents 104-106. Formulating and executing the query using the target language words is indicated by block 168 in FIG. 4A. It is very possible that if the selected document contains words in the target language, the selected document is in fact a translation from a document in the target language (or is a source document for which a target language translation exists), and those target language words will be contained in the original document (or the translation). Some common words that may appear in a target language in a selected document are the names of authors, key words for a given document, names of editors, etc. In any case, pages identified in response to query 167 are downloaded by download component 132 and checked to determine whether they are parallel to the selected document. Again, any of a wide variety of mechanisms can be used to verify parallelism, and one exemplary mechanism is sentence alignment component 138.

Determining whether the downloaded documents are parallel to the selected document is indicated by block 170 in FIG. 4A. If so, again the parallel documents are output at block 156.

If not, however, then a variety of content words are extracted from the selected document. This is indicated by block 172 in FIG. 4B. The content words are illustratively titles, proper names, and keywords for the selected document. Such content words are often referred to as named entities. The identification and extraction of named entities from a text corpus can be done using a variety of different known processes. For instance, one known process identifies person names, location names, and organization names from a textual input. Those names are tagged, using a named entity tagger, and they can be easily extracted from the textual input. Of course, the title and key words for the document are often identified in the document itself, or in metadata for the document, and they can be extracted in this way, or in any other desired way. This is illustratively implemented using a named entity extraction component 144 (shown in FIG. 3). These content words are referred to herein, for the sake of simplicity, as named entities (or NEs) 174 (shown in FIG. 3).

Once the named entities 174 are extracted from the selected document, they are provided to term translation component 146, where they are translated into the target language. This is indicated by block 176 in FIG. 4B. The translated named entities 178 are then provided to query generation component 142, which generates a query from the translated named entities 148. The query is then executed against the documents 104-106, using search engine 134. Executing the query using the translated named entities is indicated by block 180 in FIG. 4B.

Search engine 134 returns documents based on the query (or links to the documents) and download component 132 downloads relevant documents. System 136 then determines whether any of the downloaded documents are parallel to the selected document. This is indicated by block 182 in FIG. 4B. Again, this can illustratively be done using a sentence alignment score, or any other desired parallelism verification technique or mechanism.

If any of the downloaded documents are parallel to the selected documents, then they are output, as parallel documents 122, as indicated by block 156 in FIG. 4B.

If none of the downloaded documents are parallel to the selected document, the processing moves to block 184 at which point system 136 determines whether there are any more documents in the downloaded set of candidate documents 112. If so, processing reverts back to block 150 where another candidate document is selected for processing. If there are no documents in the candidate set of documents 112 left to be processed, then the system 136 has identified all parallel documents 122 based on the original query.

It will be recalled that, at a number of different times through the processing described herein, a query is executed against the documents 104-106, and relevant pages, or documents, are returned in response to the query. In one illustrative embodiment, only the most relevant document (as determined by the search engine 134) is downloaded and processed by system 100. Of course, multiple potentially relevant pages or documents can be processed as well, such as the N-best pages (or N-most relevant pages). The particular number of relevant pages can be predetermined, or can be set based upon a relevancy metric or threshold, or in any other desired manner.

Figure 5:
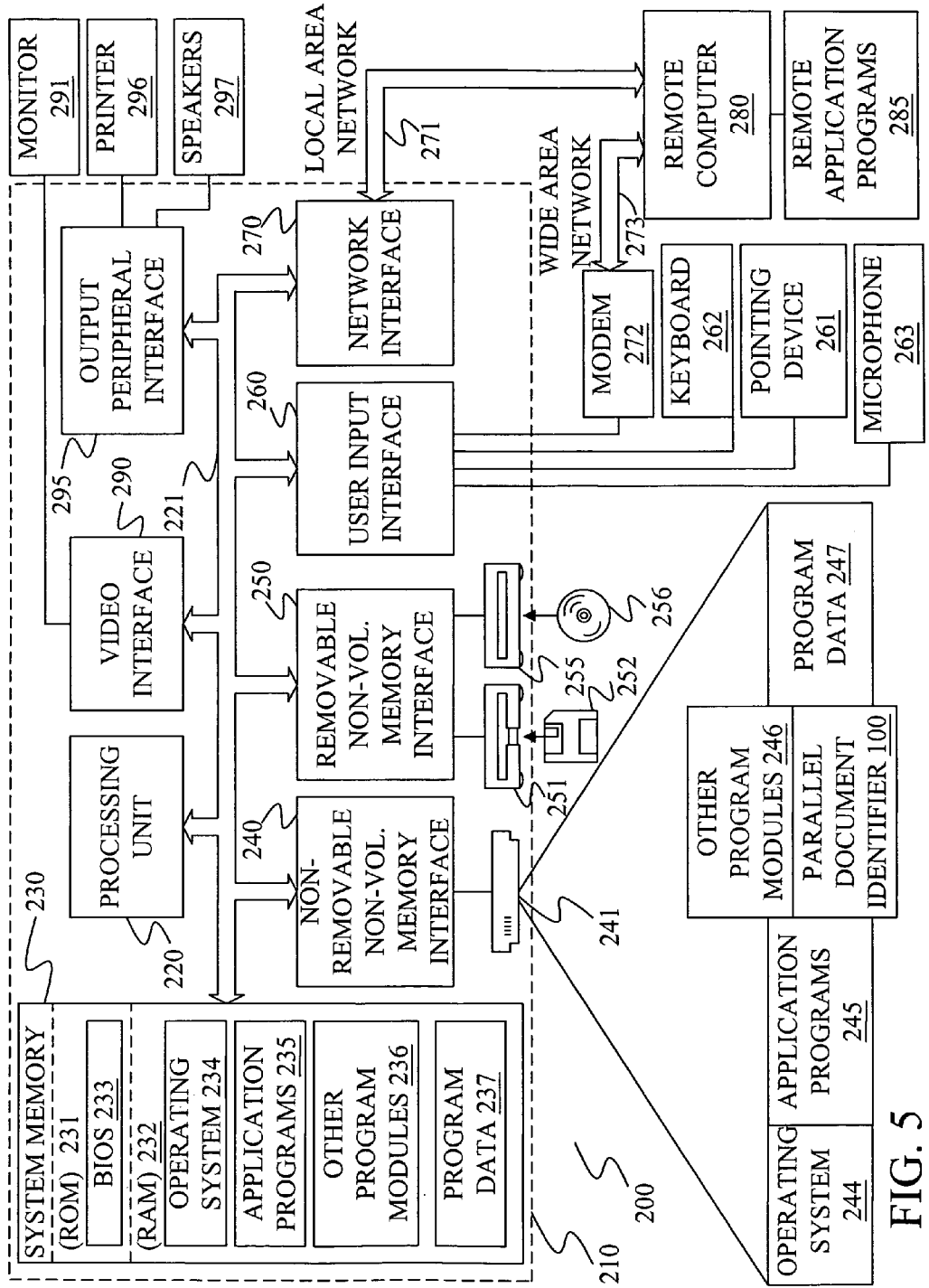
FIG. 5 is a block diagram of one illustrative operating environment in which the system shown in FIG. 1 or 3 can be used.

FIG. 5 illustrates an example of a suitable computing system environment 200 on which embodiments may be implemented. One exemplary place for parallel document identification system 100 to fit into environment 200 is in program modules 146, which is described in general below. System 100 could fit other places as well, of course. Also, the computing system environment 200 is only one example of a suitable computing environment and is not intended to suggest any limitation as to the scope of use or functionality of the claimed subject matter. Neither should the computing environment 200 be interpreted as having any dependency or requirement relating to any one or combination of components illustrated in the exemplary operating environment 200.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 5, an exemplary system for implementing some embodiments includes a general-purpose computing device in the form of a computer 210. Components of computer 210 may include, but are not limited to, a processing unit 220, a system memory 230, and a system bus 221 that couples various system components including the system memory to the processing unit 220. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 210 typically includes a variety of computer readable media. Computer readable media can be any available media that can be accessed by computer 210 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 210. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 230 includes computer storage media in the form of volatile and/or nonvolatile memory such as read only memory (ROM) 231 and random access memory (RAM) 232. A basic input/output system 233 (BIOS), containing the basic routines that help to transfer information between elements within computer 210, such as during start-up, is typically stored in ROM 231. RAM 232 typically contains data and/or program modules that are immediately accessible to and/or presently being operated on by processing unit 220. By way of example, and not limitation, FIG. 5 illustrates operating system 234, application programs 235, other program modules 236, and program data 237.

The computer 210 may also include other removable/non-removable volatile/nonvolatile computer storage media. By way of example only, FIG. 5 illustrates a hard disk drive 241 that reads from or writes to non-removable, nonvolatile magnetic media, a magnetic disk drive 251 that reads from or writes to a removable, nonvolatile magnetic disk 252, and an optical disk drive 255 that reads from or writes to a removable, nonvolatile optical disk 256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 241 is typically connected to the system bus 221 through a non-removable memory interface such as interface 240, and magnetic disk drive 251 and optical disk drive 255 are typically connected to the system bus 221 by a removable memory interface, such as interface 250.

The drives and their associated computer storage media discussed above and illustrated in FIG. 5, provide storage of computer readable instructions, data structures, program modules and other data for the computer 210. In FIG. 5, for example, hard disk drive 241 is illustrated as storing operating system 244, application programs 245, other program modules 246, and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different copies.

A user may enter commands and information into the computer 210 through input devices such as a keyboard 262, a microphone 263, and a pointing device 261, such as a mouse, trackball or touch pad. Other input devices (not shown) may include a joystick, game pad, satellite dish, scanner, or the like. These and other input devices are often connected to the processing unit 220 through a user input interface 260 that is coupled to the system bus, but may be connected by other interface and bus structures, such as a parallel port, game port or a universal serial bus (USB). A monitor 291 or other type of display device is also connected to the system bus 221 via an interface, such as a video interface 290. In addition to the monitor, computers may also include other peripheral output devices such as speakers 297 and printer 296, which may be connected through an output peripheral interface 295.

The computer 210 is operated in a networked environment using logical connections to one or more remote computers, such as a remote computer 280. The remote computer 280 may be a personal computer, a hand-held device, a server, a router, a network PC, a peer device or other common network node, and typically includes many or all of the elements described above relative to the computer 210. The logical connections depicted in FIG. 5 include a local area network (LAN) 271 and a wide area network (WAN) 273, but may also include other networks. Such networking environments are commonplace in offices, enterprise-wide computer networks, intranets and the Internet.

When used in a LAN networking environment, the computer 210 is connected to the LAN 271 through a network interface or adapter 270. When used in a WAN networking environment, the computer 210 typically includes a modem 272 or other means for establishing communications over the WAN 273, such as the Internet. The modem 272, which may be internal or external, may be connected to the system bus 221 via the user input interface 260, or other appropriate mechanism. In a networked environment, program modules depicted relative to the computer 210, or portions thereof, may be stored in the remote memory storage device. By way of example, and not limitation, FIG. 5 illustrates remote application programs 285 as residing on remote computer 280. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of identifying whether two texts are parallel, bilingual texts, comprising:
    generating a query using a set of predetermined translation triggering words identified as being words that, when used in the query, are likely to return candidate texts for which a translation into the target language exists;
    executing the query over a network to return, as a search result, a candidate text, having a plurality of sentences, in a source language, that is related to the query, the query including words in the source language and including the translation triggering words provided to a search engine to search multiple data sources, the translation triggering words triggering the search engine to search for documents with translations;
    determining whether the candidate text includes a link to a linked text, having a plurality of sentences, in a target language;
    if the candidate text includes a link to a linked text in the target language, retrieving the linked text;
    determining whether the candidate text and the linked text are parallel, bilingual texts, in which the linked text is a translation of all of the plurality of sentences in the candidate text, using a parallel identification system to compare sentences in content of the candidate text with sentences in content of the linked text, line-by-line, to determine a degree of alignment between the candidate text and the linked text to obtain a degree of parallelism and to determine that the candidate text and the linked text are parallel, bilingual texts when the degree of parallelism meets a threshold;
    providing an output identifying the candidate text and the linked text as parallel, bilingual texts when the candidate text and the linked text are determined to be parallel, bilingual texts; and
    repeating the steps of generating a query, executing the query, determining whether the candidate text includes a link, retrieving, determining whether the candidate text and the linked text are parallel, and providing an output to generate a parallel, bilingual corpus of information that includes a plurality of separate, multi-sentence source documents in a source language along with a plurality of separate, multi-sentence target documents in the target language, the target documents being translations of the source documents.

2. The method of claim 1 and further comprising:
    if the candidate text does not include a link or if the linked text and the candidate text are not parallel, bilingual texts, determining whether the candidate text includes one or more words in the target language;
    if so, extracting the one or more words in the target language from the candidate text; and executing a query over the network wherein the query includes the words in the target language.

3. The method of claim 1 and further comprising:
    prior to determining whether the candidate text includes a link, determining whether the candidate text includes a set of parallel, bi-lingual texts.

4. The method of claim 3 and further comprising:
    determining whether the candidate text includes words in the target language;
    if so, executing a target language query over the network to query the multiple data sources using the words in the target language; and
    determining whether texts returned in response to the target language query are parallel to the candidate text.

5. The method of claim 4 and further comprising:
    identifying named entities in the candidate text in the source language based on tags identifying the named entities as named entities;
    translating the named entities into the target language;
    executing a named entity query over the network to query the multiple data sources using the translated named entities; and
    determining whether texts returned in response to the named entity query are parallel to the candidate text.

6. A method of generating parallel, bi-lingual corpora, comprising:
    executing a query over a wide area network to identify a set of candidate web pages in a first language from multiple data sources;
    executing a hierarchical set of content-based processing steps, in a predetermined order, on a selected candidate web page from the set of candidate web pages to identify a possibly parallel web page in a second language that is possibly parallel to the selected candidate web page in the first language, wherein executing a hierarchical set of content-based processing steps to identify a possibly parallel web page comprises:
        determining whether the selected candidate web page, itself, includes parallel, bi-lingual texts by identifying text in the second language within the selected candidate web page and by comparing the identified text in the second language to text in the first language within the candidate web page to identify parallel, bi-lingual texts, and if not, following hyperlinks in the selected candidate web page to linked web pages and determining whether the linked web pages include text in the second language and to compare text in the second language in the linked web pages to text in the first language within the selected candidate web page to identify a possibly parallel web page;

performing parallelism verification to verify that the bi-lingual texts within the candidate web page, or the candidate web page and the possibly parallel web page, are sufficiently parallel texts related to the query;

if so, outputting an indication that the candidate web page and the possibly parallel web page are parallel, bi-lingual texts, along with textual alignments of the parallel, bi-lingual texts; and repeating the steps of executing a query, executing a hierarchical set of content-based processing steps, performing parallelism verification and outputting, to obtain at least one parallel, bi-lingual corpus that includes a first plurality of web-pages in the first language as well a second plurality of web pages in the second language that are translated versions of the first plurality of web pages.

7. The method of claim 6 and further comprising:
for each web page in the set of candidate web pages, repeating the steps of executing the hierarchical set of content-based processing steps, verifying that the candidate web page itself or that the candidate web page and the possibly parallel web page are sufficiently parallel, and outputting an indication that the candidate web page and the possibly parallel web page are parallel, bi-lingual web pages.

8. The method of claim 6 wherein the hierarchical set of content-based processing steps comprise:
determining whether the selected candidate web page includes words in the second language;
if so, executing a target language query over the wide area network based on the words in the target language; and
determining whether web pages returned based on the target language query are parallel to the selected candidate web page.

9. The method of claim 6 wherein the hierarchical set of content-based processing steps comprise:
translating named entities in the selected candidate web page into the target language;
executing a named entity query over the wide area network based on the translated named entities; and
determining whether web pages returned based on the named entity query are parallel to the selected candidate web page.

10. The method of claim 6 wherein executing the query comprises:
forming the query of translation trigger words selected to identify web pages that have a corresponding translationally equivalent web page.

11. A system for identifying parallel, bi-lingual documents stored in one or more data stores accessible over a network, the system comprising:
a search engine executing a query over the network against the one or more data stores having a plurality of documents each defining a plurality of sentences, the query including at least one document source identifier and including translation triggering words to trigger the search engine to look for documents with translations, the search engine further retrieving a candidate document in a first language from the plurality of documents based on the query;
a parallelism verification system that comprises:
a document scanning component scanning the candidate document to determine whether the candidate document includes words in a second language, the second language being different than the first language;
a parallelism verification component determining whether the words in the second language comprise parallel text, that is parallel to text in the first language, in the candidate document, the parallelism verification component performing a line-by-line comparison of words in the first language within at least one source document associated with the at least one document source identifier and words in the second language within the candidate document to determine whether there are a sufficient number of aligned sentences to determine that the candidate document is parallel to the at least one source document; and
a data store, the search engine and the parallelism verification component repeatedly executing a query, scanning candidate documents, determining whether candidate documents and source documents are parallel and storing parallel documents on the data store so the data store stores a parallel, bi-lingual corpus that has a plurality of first documents in the first language and a plurality of second documents in the second language, the second documents being translated versions of the first documents.

12. The system of claim 11 wherein, when the candidate document is not parallel to the at least one source document, the parallelism verification system is configured to identify links in the candidate document to linked documents in the second language, and wherein the a parallelism verification component is configured to determine whether the words in the linked document are parallel to words in the candidate document.

13. The system of claim 11 wherein the parallelism verification system comprises:
a query generation component configured to generate a query, executable by the search engine, based on the words in the second language identified by the document scanning component.

14. The system of claim 11 wherein the parallelism verification system comprises:
a named entity extraction component configured to extract named entities from the candidate document; and
a translation component configured to translate the named entities into the second language.

* * * * *